United States Patent Office 3,586,698
Patented June 22, 1971

3,586,698
MANUFACTURE OF ALKYL-1,3-DIOXANES
Yoshio Ishii, Shizuyoshi Sakai, and Yuji Kawashima, Nagoya-shi, Japan, assignors to New Japan Chemical Co., Ltd., Fushimi-ku, Kyoto-shi, Japan
No Drawing. Filed Mar. 19, 1968, Ser. No. 714,326
Claims priority, application Japan, Mar. 29, 1967, 42/20,162; July 19, 1967, 42/46,773
Int. Cl. C07d 15/04
U.S. Cl. 260—340.7                                    6 Claims

ABSTRACT OF THE DISCLOSURE

A process for manufacturing an alkyl-1,3-dioxane which comprises reacting an olefin having 3 to 8 carbon atoms with formaldehyde in the presence of a catalytic amount of a metal compound which forms a complex compound with the starting olefin under the reaction conditions; the said metal being one member of the group consisting of technetium, rhenium, ruthenium, rhodium, palladium, osmium, iridium and platinum.

---

This invention relates to the manufacture of alkyl-1,3-dioxanes, and more particularly to a process for manufacturing alkyl-1,3-dioxanes by the addition reaction of olefins and formaldehyde.

The alkyl-1,3-dioxanes are useful compounds as organic solvents and intermediates for manufacturing various organic compounds. For example, 4,4-dimethyl-1,3-dioxane may be used as the starting material for producing isoprene.

In the prior art 1,3-dioxanes have been generally synthesized by reacting olefins with formaldehyde in the presence of an acid catalyst, such as sulfuric acid, phosphoric acid and the like. According to the known methods, however, a considerable amount of undesired byproducts, such as alcohols and cyclic ethers, are produced, reducing selectivity and yield rate of the desired 1,3-dioxanes. When isobutylene is reacted with formaldehyde in the presence of the acid catalyst, for instance, undesired 3-methyl-1,3-butanediol, 5-methylol-6,6-dimethyl-1,3-dioxane and the like byproducts are produced considerably besides the desired 4,4-dimethyl-1,3-dioxane.

A main object of the invention is accordingly to provide a process for manufacturing alkyl-1,3-dioxanes in which the desired 1,3-dioxanes are obtainable selectively in a high yield with the minimum production of the unwanted byproducts.

According to the researches of the present inventors it has now been found that when a specific transition metal compound is used as a catalyst in the reaction of olefins and formaldehyde, the starting olefins are converted selectively into alkyl-1,3-dioxanes, making it possible to produce the desired akyl-1,3-dioxanes in a high yield with a selectivity of higher than 90 mole percent.

This invention is based on the above new discoveries and characterized by carrying out the reaction of olefins and formaldehyde to alkyl-1,3-dioxanes in the presence of a metal compound which forms a complex compound with the starting olefin under the reaction conditions; the said metal being one member of the group consisting of technetium, rhenium, ruthenium, rhodium, palladium, osmium, iridium and platinum.

The catalysts used in the invention are various compounds of said metals, which form complex compounds with the starting olefins under the reaction conditions. The examples of the compounds are oxides, halides, sulfates, nitrates, cyanates, acetates, halometal complexes, carbonyl compounds and the like compounds of any of said metals, and most desirable are halides, acetates and halometal complexes. There may be also used as a catalyst a compound capable of forming any of said metal compound under the reaction conditions and a complex compound of said metal with an olefin. Among them the compounds of rhenium, ruthenium, rhodium, palladium, iridium and platinum are preferred, most desirable being palladium compounds. The representatives of the preferred catalyzing compounds are $PdO$, $PtO$, $PdCl$, $Pd(CH_3COO)_2$, $ReCl_5$, $ReCl_3$, $RuCl_3 \cdot H_2O$, $Na_2[Ru(NO)Cl_5]$, $RhCl_3 \cdot 2H_2O$, $IrCl_4$, $H_2PtCl_6 \cdot 6H_2O$, $PdBr_2$, $Na_2PdCl_4$, $PdF_2$, $PdI_2$, $PtCl_2$, $PtCl_4$, $Na_3RhCl_6$, $Na_3IrCl_6$, $Na_2[Pd(CO)Cl_2]$, etc. Said catalyzing compounds may be used in a catalytic amount, usually in the range of 0.003 to 0.2 mole by metal mole, preferably 0.005 to 0.04 mole by metal mole, per mole of the starting olefin. The crystal water in the catalyzing compounds does not affect the reaction of the invention, so the compounds either containing or not containing the crystal water may be used as a cataylst.

To accelerate the reaction it is desirable to use the catalyst in combination with an inorganic oxidant whereby the desired alkyl-1,3-dioxanes are obtainable in a higher yield. The examples of the oxidants are inorganic acid salts of copper, iron, mercury, cobalt, tin and nickel, and most desirable are cupric chloride and ferric chloride. Such inorganic oxidants may be used in the terms of metal weight of 0.5 to 6 times, preferably 1 to 4 times the metal weight of the catalyzing compounds.

The olefins used in the invention are those having 3 to 8 carbon atoms, and particularly isobutylene and the like olefins of 4 to 6 carbon atoms having alkyl side-chains are preferred. As the formaldehyde there may be used formalin, paraformaldehyde and gaseous formaldehyde. The amount of the formaldehyde used is not critical in the invention and usually theoretical or excess amount of the formaldehyde is used. Preferably it is used in the range of 2 to 5 moles per mole of the starting olefin.

The reaction of the invention may be carried out under liquid phase, so that, if necessary, solvents are added to the reaction zone. Examples of the solvents are benzene, toluene, dichloroethane, tetrachloroethane, chloroform, carbon tetrachloride, n-hexane, cyclohexane, methyl ethyl ketone, ethyl acetate, etc., and desirable are benzene, dichloroethane, chloroform, carbon tetrachloride and n-hexane. The amount of the solvent used varies over a wide range, but usually it is employed in the range of 0.3 to 10 times, preferably 0.5 to 2 times the weight of the starting olefin.

The reaction of the invention may be carried out by a batch system or in a continuous manner at a room temperature or a moderately elevated temperature under a normal atmospheric pressure or an increased pressure. According to one of the preferred methods for carrying out the pocess of the invention, olefin, formaldehyde and catalyzing metal compound or a mixture of catalyzing metal compound and inorganic oxidant are stirred in the presence or absence of the solvent at 15 to 130° C., preferably 30 to 60° C., under 1 to 30 atmospheric pressure for about 0.5 to 5 hours, after which the resultant reaction mixture is distilled to remove the unreacted olefin and low boiling byproducts, whereby the desired alkyl-1,3-dioxanes are obtained.

The reaction may be carried out either in the presence or absence of air.

To accelerate the reaction it is preferred to control pH of the reaction system to not higher than 9, preferably 1 to 3. For this purpose inorganic acids, such as hydrochloric acid, may be added to the reaction system.

As a reactor there may be used those made of materials resistant to corrosive action of the starting compounds and the products. Desirable are those inner surfaces of which are coated with glass, porcelains, resins, titanium alloys, etc.

For fuller understanding of the invention examples are given below, in which yield and selectivity of alkyl-1,3-dioxanes are defined by the following equations:

Yield in percent $$= \frac{\text{Number of moles of alkyl-1,3-dioxanes obtained}}{\text{Number of moles of olefin fed}}$$
$$- \text{Number of moles of unreacted olefin} \times 100$$

Selectivity in percent $$= \frac{\text{Number of moles of alkyl-1,3-dioxanes obtained}}{\text{Total moles of each reaction product}} \times 100$$

EXAMPLE 1

In a 1 liter glass-lined autoclave were placed 1 gram of palladium chloride, 39.6 grams of 3-methyl-1-butene, 138 grams of 37 weight percent formalin and 3.8 grams of dihydrated cupric chloride, and after the air in the autoclave was replaced with nitrogen gas the mixture was heated with stirring of 60 r.p.m. at 50° C. for 18 hours. The maximum pressure during the reaction was 2.5 kg./cm.$^2$. The resultant reaction mixture was separated into oil layer and water layer, and distillation of the oil layer gave 41.5 grams of a distillate boiling at 50 to 58° C./20 mm. Hg.

By elementary analysis, gas chromatographic analysis, infrared spectroscopic analysis and nuclear magnetic resonance the distillate was confirmed to be a mixture of 4,4,5-trimethyl-1,3-dioxane and 4-isopropyl-1,3-dioxane in weight ratio of 93:7. The yield rate of the dioxanes thus obtained was 57% and selectivity was 92%. Total amount of byproducts was less than 2 grams.

EXAMPLE 2

Reaction was carried out in the same manner as in Example 1 except that prior to the reaction air was forced in at 5 kg./cm.$^2$ instead of replacing with nitrogen. The maximum pressure during the reaction was 7.4 kg./cm.$^2$. Distillation of the resultant reaction mixture gave 60 grams of a distillate boiling at 50–58° C./20 mm. Hg. By the analyses same as in Example 1 the distillate was confirmed to be the same dioxane mixture as in Example 1. The yield rate was 83% and selectivity was 92%.

EXAMPLE 3

Reaction was carried out in the same manner as in Example 1 except that 31 grams of isobutylene was used with 81 grams of benzene in the place of 3-methyl-1-butene, whereby 41 grams of a distillate boiling at 132 to 134° C./760 mm. Hg was obtained. By analyses same as in Example 1 the distillate was confirmed to be 4,4-dimethyl-1,3-dioxane. The yield rate was 63% and selectivity was 94%.

EXAMPLE 4

Reaction was carried out in the same manner as in Example 1 except that 54 grams of paraformaldehyde was used in the place of formalin but dihydrated cupric chloride was not used, whereby 38.6 grams of a 92:8 weight ratio mixture of 4,4,5-trimethyl-1,3-dioxane and 4-isopropyl-1,3-dioxane was obtained. The yield rate was 53% and selectivity was 93%.

EXAMPLE 5

In the presence of 1 gram of palladium chloride and the following inorganic oxidant, the predetermined amount of the olefin and formaldehyde shown in Table 1 below were reacted in the same manner as in Example 1.

TABLE 1

| Example Number | Inorganic oxidant (grams) | Olefin (grams) | Formaldehyde (grams) |
| --- | --- | --- | --- |
| 5-1 | Cupric chloride (2.9) | Butene-1 (62.7) | 37% formalin (181). |
| 5-2 | do | Isobutene (31.0) | 37% formalin (92). |
| 5-3 | (0) | do | 37% formalin (138). |
| 5-4 | Ferric chloride (3.6) | 3-methyl-butene-1 (39.6) | Do. |
| 5-5 | do | do | Paraformaldehyde (54). |
| 5-6 | (0) | do | Do. |
| 5-7 | Cupric chloride (3.8) | 3-methyl-butene-2 (19.8) | Formalin (69). |

The resultant dioxane was separated by distillation. The results are shown in Table 2 below:

TABLE 2

| Example Number | Dioxanes obtained | Grams | Yield (percent) | Selectivity (percent) |
| --- | --- | --- | --- | --- |
| 5-1 | 4,5-dimethyl-1,3-dioxane / 4-ethyl-1,3-dioxane | 66.5 / 5.0 | 55 | 91 |
| 5-2 | 4,4-dimethyl-1,3-dioxane | 57.1 | 88 | 95 |
| 5-3 | do | 51.3 | 79 | 94 |
| 5-4 | 4,4,5-trimethyl-1,3-dioxane / 4-isopropyl-1,3-dioxane | 57.0 / 3.0 | 83 | 92 |
| 5-5 | 4,4,5-trimethyl-1,3-dioxane / 4-isopropyl-1,3-dioxane | 54.1 / 4.1 | 80 | 93 |
| 5-6 | 4,4,5-trimethyl-1,3-dioxane / 4-isopropyl-1,3-dioxane | 35.5 / 3.1 | 53 | 93 |
| 5-7 | 4,4,5-trimethyl-1,3-dioxane / 4-isopropyl-1,3-dioxane | 28.7 / 2.2 | 85 | 95 |

EXAMPLE 6

In the presence of 1 gram of palladium acetate and the following inorganic oxidant, the predetermined amount of the olefin and formaldehyde shown in Table 3 below were reacted in the same manner as in Example 1.

TABLE 3

| Example Number | Inorganic oxidant (grams) | Olefin (grams) | Formaldehyde (grams) |
| --- | --- | --- | --- |
| 6-1 | Cupric chloride (2.4) | Isobutene (26.3) | 37% formalin (77). |
| 6-2 | (0) | do | Do. |
| 6-3 | Mercuric chloride (2.5) | 3-methyl-butene-2 (33.0) | Do. |
| 6-4 | Cupric chloride (2.4) | 3-methyl-butene-1 (33.0) | Do. |
| 6-5 | (0) | 3-methyl-butene-1 (65.8) | Paraformaldehyde (57). |

The resultant dioxane was separated by distillation. The results are shown in Table 4 below:

TABLE 4

| Example Number | Dioxanes obtained | Grams | Yield (percent) | Selectivity (percent) |
|---|---|---|---|---|
| 6-1 | 4.4-dimethyl-1.3-dioxane | 43.6 | 80 | 94 |
| 6-2 | do | 33.8 | 62 | 91 |
| 6-3 | {4.4.5-trimethyl-1.3-dioxane / 4-isopropyl-1.3-dioxane} | 37.3 / 2.4 | 65 | 94 |
| 6-4 | {4.4.5-trimethyl-1.3-dioxane / 4-isopropyl-1.3-dioxane} | 38.4 / 2.5 | 67 | 90 |
| 6-5 | {4.4.5-trimethyl-1.3-dioxane / 4-isopropyl-1.3-dioxane} | 63.8 / 3.4 | 55 | 92 |

EXAMPLE 7

In a 1 liter glass-lined autoclave were placed 1.0 g. of hexahydrated chloroplatinic acid, 10.8 grams of isobutylene, 31.3 grams of 37 weight percent formalin and 28.0 grams of benzene, and the mixture was heated with stirring of 60 r.p.m. at 50° C. for 18 hours.

The resultant reaction mixture was separated into oil layer and water layer, and distillation of the oil layer gave 15.7 grams of 4,4-dimethyl-1,3-dioxane as a distillate boiling at 132 to 134° C./760 mm. Hg. The yield rate was 70% and selectivity was 90%.

EXAMPLE 8

Reaction was carried out in the same manner as in Example 7 except that sodium chloroplatinate was used in the place of chloroplatinic acid, whereby 4,4-dimethyl-1,3-dioxane was obtained with the yield rate of 67% and selectivity of 90%.

EXAMPLE 9

In the presence of the following catalyst and inorganic oxidant, the predetermined amount of the olefin and formaldehyde shown in Table 5 below were reacted in the same manner as in Example 7.

What we claim is:

1. A process for manufacturing an alkyl-1,3-dioxane which comprises reacting an olefin having 3 to 8 carbon atoms with formaldehyde in the presence of a catalytic amount of a metal compound which forms a complex compound with the starting olefin under the reaction conditions; the said metal compound being selected from the group consisting of PdO, PtO, $PdCl_2$, $Pd(CH_3COO)_2$, $ReCl_5$, $ReCl_3$, $RuCl_3 \cdot H_2O$, $Na_2[Ru(NO)Cl_5]$, $RhCl_3 \cdot 2H_2O$ 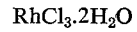

$IrCl_4$, $H_2PtCl_6 \cdot 6H_2O$, $PdBr_2$, $Na_2PdCl_4$, $PdF_2$, $PdI_2$, $PtCl_2$, $PtCl_4$, $Na_3RhCl_6$, $Na_3IrCl_6$, $Na_2[Pd(CO)Cl_2]$, and sodium chloroplatinate.

2. The process for manufacturing an alkyl-1,3-dioxane according to claim 1, in which said metal compound is palladium compound.

3. The process for manufacturing an alkyl-1,3-dioxane according to claim 2, in which said palladium compound is one member of the group consisting of palladium chloride and palladium acetate.

4. The process for manufacturing an alkyl-1,3-dioxane according to claim 1, in which said metal compound is used in the range of 0.003 to 0.2 mole by metal mole per mole of the starting olefin.

TABLE 5

| Example Number | Catalyst (grams) | Inorganic oxidant (grams) | Olefin (grams) | Formaldehyde (grams) |
|---|---|---|---|---|
| 9-1 | Palladium (II) iodide (1.0) | | n-Butene-1 (7.8) | Paraformaldehyde (9). |
| 9-2 | Platinum (II) chloride (1.0) | | Isobutene (21.1) | Formalin (61). |
| 9-3 | Chloroplatinic acid (1.0) | Cupric chloride (1.0) | Isobutene (10.8) | Formalin (32). |
| 9-4 | Chloroplatinic acid (1.0) | do | 3-methyl-butene-1 (13.5) | Do. |
| 9-5 | Rhenium (V) chloride (1.0) | Ferric chloride (1.0) | Isobutene (19.2) | Formalin (55.5). |
| 9-6 | Rhenium (V) chloride (1.0) | | do | Do. |
| 9-7 | Rhodium (III) chloride (1.0) | Cobalt chloride (1.0) | 3-methyl-butene-2 (28.5) | Formalin (66.2). |
| 9-8 | Iridium (IV) chloride (1.0) | | Isobutene (52.8) | Paraformaldehyde (71). |

The resultant dioxane was separated by distillation. The results are shown in Table 6 below:

5. The process for manufacturing an alkyl-1,3-dioxane according to claim 1, in which said metal compound is

TABLE 6

| Example Number | Dioxanes obtained | Grams | Yield (percent) | Selectivity (percent) |
|---|---|---|---|---|
| 9-1 | {4,5-dimethyl-1,3-dioxane / 4-ethyl-1,3-dioxane} | 6.7 / 0.5 | 45 | 91 |
| 9-2 | 4,4-dimethyl-1,3-dioxane | 32.7 | 74 | 90 |
| 9-3 | do | 19.4 | 82 | 92 |
| 9-4 | {4,4,5-trimethyl-1,3-dioxane / 4-isopropyl-1,3-dioxane} | 16.3 / 1.2 | 70 | 90 |
| 9-5 | 4,4-dimethyl-1,3-dioxane | 24.8 | 63 | 90 |
| 9-6 | do | 21.8 | 55 | 92 |
| 9-7 | {4,4,5-trimethyl-1,3-dioxane / $4-isopropyl-1,3-dioxane} | 36.3 / 1.9 | 72 | 93 |
| 9-8 | {4,4,5-trimethyl-1,3-dioxane / 4-isopropyl-1,3-dioxane} | 21.5 / 1.1 | 58 | 90 |
| 9-9 | 4,4-dimethyl-1,3-dioxane | 63.4 | 58 | 91 | used in combination with an inorganic oxidant in a weight ratio by metal of between 1:0.5 and 1:6, said oxidant being selected from the group consisting of cupric chloride, ferric chloride, mercuric chloride and cobalt chloride.

6. The process for manufacturing alkyl-1,3-dioxane according to claim 5, in which said inorganic oxidant is one member of the group consisting of cupric chloride and ferric chloride.

References Cited

UNITED STATES PATENTS 3,475,461  10/1969  Lloyd _____ 260—347.8

ALEX MAZEL, Primary Examiner

J. H. TURNIPSEED, Assistant Examiner